United States Patent [19]

Pancoe

[11] 4,019,261
[45] Apr. 26, 1977

[54] MOTION SYSTEM FOR A FLIGHT SIMULATOR

[75] Inventor: Edward G. Pancoe, Chenango Forks, N.Y.

[73] Assignee: The Singer Company, Binghamton, N.Y.

[22] Filed: May 9, 1975

[21] Appl. No.: 576,092

[52] U.S. Cl. .............................. 35/12 P; 248/373
[51] Int. Cl.² ........................................ G09B 9/08
[58] Field of Search ............. 35/12 K, 12 P, 12 E, 35/12 S, 12 W; 46/1 B, 1 H; 248/163, 188.1, 276, 277, 371, 373, 376; 272/1 C, 31 A, 31 B

[56] References Cited

UNITED STATES PATENTS

| | | | |
|---|---|---|---|
| 3,281,962 | 11/1966 | Pancoe | 35/12 P |
| 3,577,655 | 5/1971 | Pancoe | 35/12 P |
| 3,619,911 | 11/1971 | Pancoe | 35/12 P |

*Primary Examiner*—Richard C. Pinkham
*Assistant Examiner*—Vance Y. Hum

*Attorney, Agent, or Firm*—Jeffrey Rothenberg; James C. Kesterson

[57] ABSTRACT

A compact, cascaded three degrees of freedom (DOF) motion system for providing roll, pitch and heave movement to a cockpit of a flight simulator. The cockpit is nested within a rotatable roll frame which is gimbaled within a pitch frame. The pitch frame is pivotally connected at its rear to a vertically disposed and translatable heave frame. A pair of heavy, torsionally rigid, horizontally disposed, torque tubes in a four-bar parallelogram linkage arrangement serve to connect the heave frame to a fixed base frame and to ensure parallel movement of said heave frame. Servo actuators connected to each of the roll, pitch and heave frames permit simultaneous, independent three-axis motion. Balance actuators, frame locking mechanisms, as well as other safety features, ensure failsafe operation of the improved motion system.

17 Claims, 5 Drawing Figures

MOTION SYSTEM FOR A FLIGHT SIMULATOR

BACKGROUND OF THE INVENTION

1. Field of the Invention

This invention relates generally to flight simulation and, more particularly, to a motion system for the student's station, or cockpit, of a grounded flight trainer.

2. Description of the Prior Art

Motion cue generation has been a vital aspect of flight training ever since the early LINK trainers first incorporated a bellows type motion system. Over the years, various motion systems have been developed in an attempt to simulate the transient effects produced by actual aircraft motion.

U.S. Pat. No. 2,930,144 describes a typical motion system of the prior art. As illustrated therein, limited rotational and translational movement are provided to a trainer cockpit by means of a massive structure positioned beneath the cockpit. Since flight simulators are normally installed within a building or other limited volume structure, the positioning of a massive, motion producing structure beneath the cockpit drastically reduces the space available for cockpit motion and, thereby, severely limits the available excursion range. In addition, the three degrees of motion provided by this prior art device are interdependent, which tends to detract from simulated training value because of the unrealistic limitations imposed on each degree of freedom when some other degree of freedom has been exhausted.

To overcome these disadvantages, the present inventor previously developed a Motion System for an Aircraft Flight Simulator, as described in U.S. Pat. No. 3,281,962. Employing a unique cascaded design, and a novel four-bar linkage approach, the patented motion system afforded numerous advantages over the prior art. In addition to at least four independent degrees of motion freedom throughout distances not before possible, the patented motion system also provided full vertical clearance of the cockpit with all framework and actuators outside of the cockpit vertical profile, complete independent operation of all motion actuators throughout their full range of motion, resulting in simpler computer programming and more effective simulation, and selective infinite pitch radius effects.

The present invention improves upon applicant's earlier work, retaining the significant advantages thereof, while further refining the motion system and advancing the state of the art. The instant invention improves upon the four-bar parallelogram mechanism of the prior design, by incorporating torque tubes therein. The torsional rigidity of these tubes makes unnecessary the scissor mechanism employed at the forward end of the earlier assembly to ensure lateral stability. Further, the present invention simplifies the pitch frame actuating mechanism by replacing the pair of rotary pitch actuators in the previous design, with standard linear actuators. In addition, the current invention locates the pitch pivot points behind, rather than to the side of the cockpit, thus more accurately reflecting the actual pitch characteristics of many modern day aircraft and avoiding the necessity of concurrent operation of the pitch and heave actuators to locate an "effective" pitch axis behind the cockpit. The present invention further incorporates a unique hydraulic mechanism to accomplish pitch lock, as well as other new safety features.

The three DOF motion system of the instant invention is characterized by unusual compactness, requiring a ceiling height of only 12 feet. It exhibits an extensive excursion range and provides a maximum of payload access. Furthermore, this rugged, fail-safe system realistically simulates aircraft motion effects in a highly efficient and economical manner.

SUMMARY OF THE INVENTION

According to the present invention, these advantages are achieved by nesting the cockpit of a flight trainer within a roll frame. The roll frame is gimbaled within a pitch frame which, in turn, is pivotably connected at its rear to a vertically translatable heave frame. A pair of torque tubes in a four-bar parallelogram linkage arrangement connect the heave frame to a base frame. The latter frame is lagged to the site floor. A servo actuator connected to each of the moveable frames imparts roll, pitch and heave motion to the supported cockpit. Auxilliary balance actuators in conjunction with the torque tubes provide increased stability to the system. A mechanical roll lock mechanism, manually positionable struts and a hydraulic pitch lock system optionally serve to maintain the payload in a level position when the motion system is shut down.

One object of the invention, therefore, is to provide an improved motion system for the student's station of a grounded flight trainer.

Another object of the invention is to provide an improved motion system for a flight simulator which minimizes space requirements while maximizing excursion capability.

Yet another object of the invention is to provide an improved motion system which is capable of imparting substantial, simultaneous and independent excursion along three axes to a supported cockpit and auxilliary visual display apparatus.

Still another object of the invention is to provide a unique arrangement of cascaded frames for supporting and moving a payload, which arrangement affords a maximum of payload access and a minimum of obstruction from beneath.

A further object of the invention is to provide a rugged, stabilized, fail-safe motion system for realistically simulating aircraft motion effects.

A still further object of the invention is to provide a highly compact, efficient and economical system for simulating the motion of various aircraft.

Other objects and advantages of the invention will in part be obvious and will in part appear hereinafter.

The invention accordingly comprises the features of construction, combination of elements, and arrangement of parts, which will be exemplified in the construction hereinafter set forth; the scope of the invention will be indicated in the claims.

BRIEF DESCRIPTION OF THE DRAWINGS

For a fuller understanding of the nature and objects of the invention, reference should be had to the following detailed description taken in conjunction with the accompanying drawings, in which.

DETAILED DESCRIPTION OF THE PREFERRED EMBODIMENT

Figure 1:
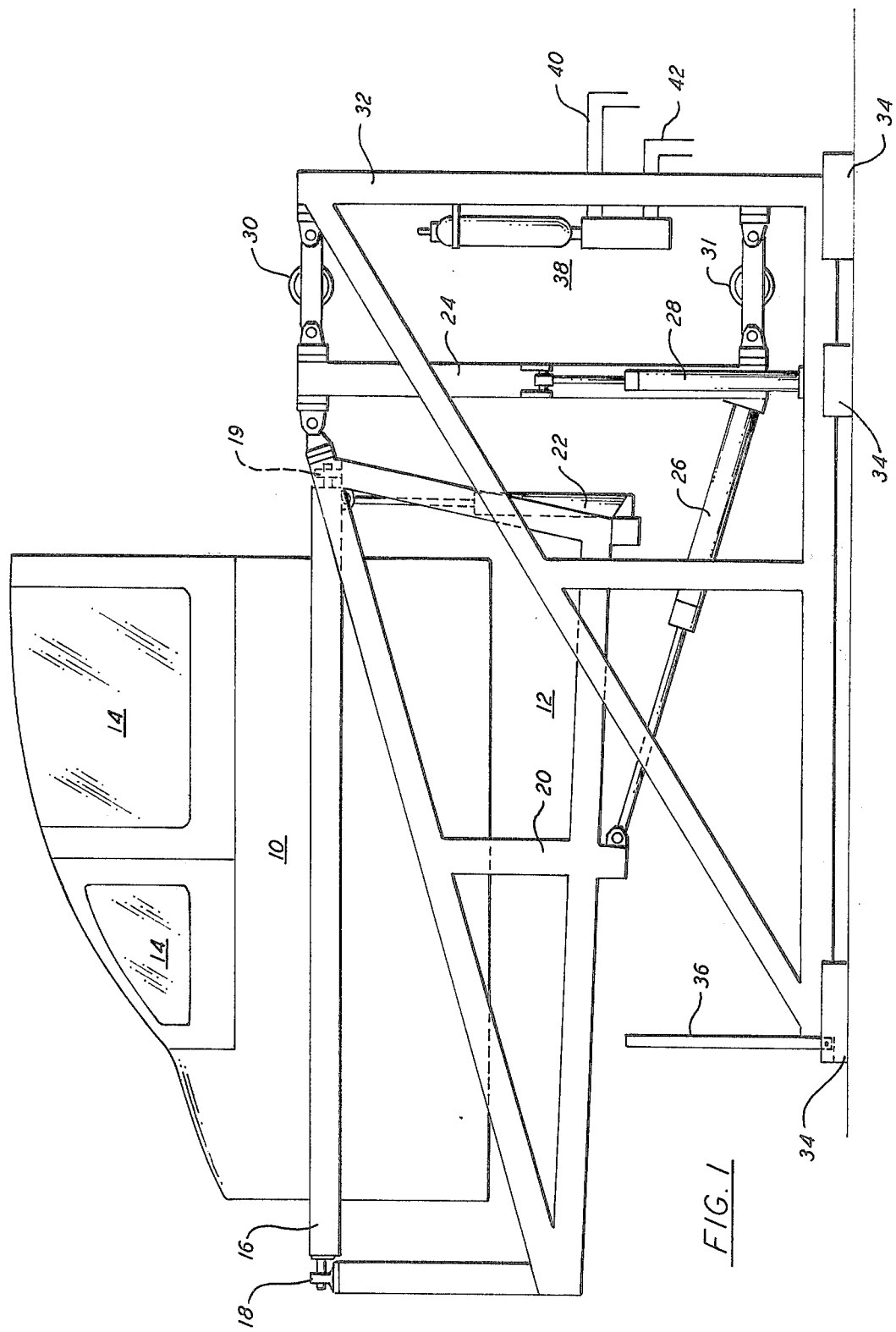
FIG. 1 is a side view of the improved motion system of the present invention supporting a nested cockpit.

Referring now to the drawings, FIG. 1 is a side view of a grounded flight trainer incorporating a preferred embodiment of the motion system of the invention. As there shown, a trainer cockpit 10, containing seats for one or more trainees and other operating personnel, a large number of simulated indicators and controls, hydraulic actuators for imparting loading forces to various ones of the controls, and certain other conventional devices (not shown), is supported for movement by motion system 12. It should be understood that the term "trainer cockpit" includes the simulated flight deck of modern aircraft simulators as well as any other crew or student's station of an aircraft trainer.

Windows 14 of trainer cockpit 10 may be masked, frosted or transparent. Clear windows permit the trainees to view a visual display. Although no apparatus for providing a visual display is illustrated, the improved motion system of the invention easily accommodates such auxiliary equipment.

Figure 2:
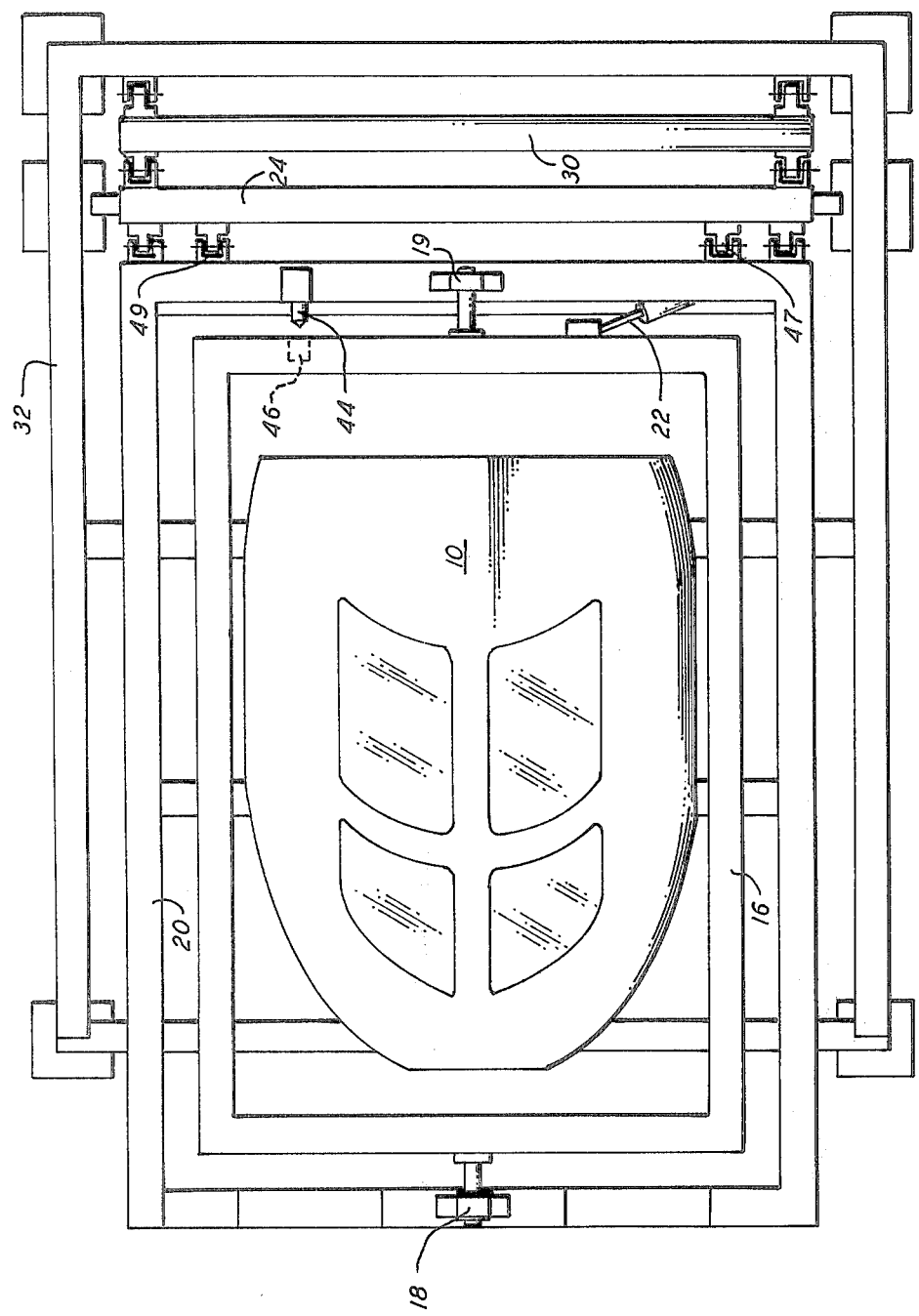
FIG. 2 is a plan view of the embodiment illustrated in FIG. 1.

As generally illustrated in FIGS. 1 and 2, motion system 12 is a cascaded system consisting of a separate movable frame and servo actuator for each of the three desired degrees of freedom (i.e., roll, pitch and heave), nested inside a fixed, trussed, base frame.

More particularly, trainer cockpit 10 is directly supported by secondary framing, angle irons or the like, within a rectangular roll frame 16. Roll frame 16 is supported by bidirectional rotation about a longitudinal axis by a pair of fore and aft pillow blocks 18, 19 mounted upon a pitch frame 20. The roll frame is driven at its aft end by a single hydraulic actuator 22, mounted on the pitch frame, to reproduce aircraft roll effects. The roll frame also provides a convenient mounting surface for any auxiliary visual display equipment.

Pitch frame 20 not only acts as an outer gimbal for the roll frame but also supplies pitching movement to the supported cockpit. This welded, tubular frame assembly is pivotally connected at its upper rear corners to the top member of a heave frame 24. A set 26 of three linear actuators, connected between the lower portions of heave frame 24 and pitch frame 20, produce the desired pivotal movement of frame 20.

Heave frame 24 is a rigid, vertically translatable, rectangular frame which imparts z-direction movement to cockpit 10. A lift actuator 28 is mounted on the right side of heave frame 24 and a similar hydraulic actuator is positioned on the left side thereof. The heave frame is maintained in a vertical plane by a pair of horizontally disposed, torsionally rigid, torque tubes 30, 31.

A set of four interconnecting arms at the ends of the torque tubes 30, 31, form a parallelogram linkage between the heave frame and a fixed, base frame 32. As detailed in U.S. Pat. No. 3,281,962, the major advantage of this parallelogram linkage is that the vertical force applied by the heave actuators is independent of the location of the cockpit. Aft bearings connect the arms of the two torque tubes to base frame 32.

The trussed, fixed frame 32 describes a vertical plane at the rear of the motion assembly and extends forward on each side of the heave and pitch frames to a point forward of the center of gravity of the entire system to minimize floor loading and prevent inadvertent encroachment into the area defined by the motion envelope. This frame is lagged to the floor through six mounting plates 34.

To the front end of the base frame 32, are pivotally connected two independent, manually positioned struts 36, 36 which support the pitch frame 20 at a near level position during sustained shut down. The space between the rear portion of the fixed frame 32 and the heave frame 24 preferably contains the entire distribution network 38 (described in detail below) for the hydraulic drive of the motion system. A supply line 40 and return line 42 connect the manifold and plumbing of the distribution network 38 to an external hydraulic power supply.

The improved motion system of the invention also incorporates shut-down locking devices for both roll and pitch. The roll lock consists of a hydraulically driven pin 44 (see FIG. 2) mounted on the pitch frame for engagement with a bushing 46 on the roll frame. Pitch locking is accomplished with a hydraulic valve which closes on demand and blocks fluid return to an accumulator from two balance pitch actuators, as described more fully hereinafter. No lock is required for the heave system which will settle to the retracted length of the heave actuators upon motion shut-down.

As an added safety feature, a pair of safety bolt connections 47, 49 (FIG. 2) are provided between the pitch and heave frames, inboard of the pitch pivot bearing. In the unlikely event of pitch pivot failure, these connections would prevent loss of the payload.

The above comprises the general mechanical arrangement of the improved motion system. This system provides substantial three axis motion, with the actuators and mechanisms for each axis operating independently and simultaneously. With a typical 5,000 pound payload (including cockpit, crew member and visual display apparatus), the motion system will provide the following minimum excursion and acceleration capabilities:

|       | Excursion    | Acceleration             |
|-------|--------------|--------------------------|
| Pitch | ± 15 degrees | ± 25 degrees/sec.$^2$    |
| Roll  | ± 15 degrees | ± 50 degrees/sec.$^2$    |
| Heave | ± 6 inches   | ± 0.5 g                  |

In operation, the hydraulic actuators, under control of an associated computer, independently move the heave, pitch and roll frames scaled distances to induce motion sensations representative of sensations experienced in an operational aircraft. Through conventional flight simulator computer control, motion effects associated with the following conditions can be reproduced by the improved motion system of the invention: catapult take-off buffets, stalls, skids, slips, banks, climbs, dives, rolls, acceleration and deceleration, touch down attitude and impact, rough air, stall and Mach buffet.

Figure 3:
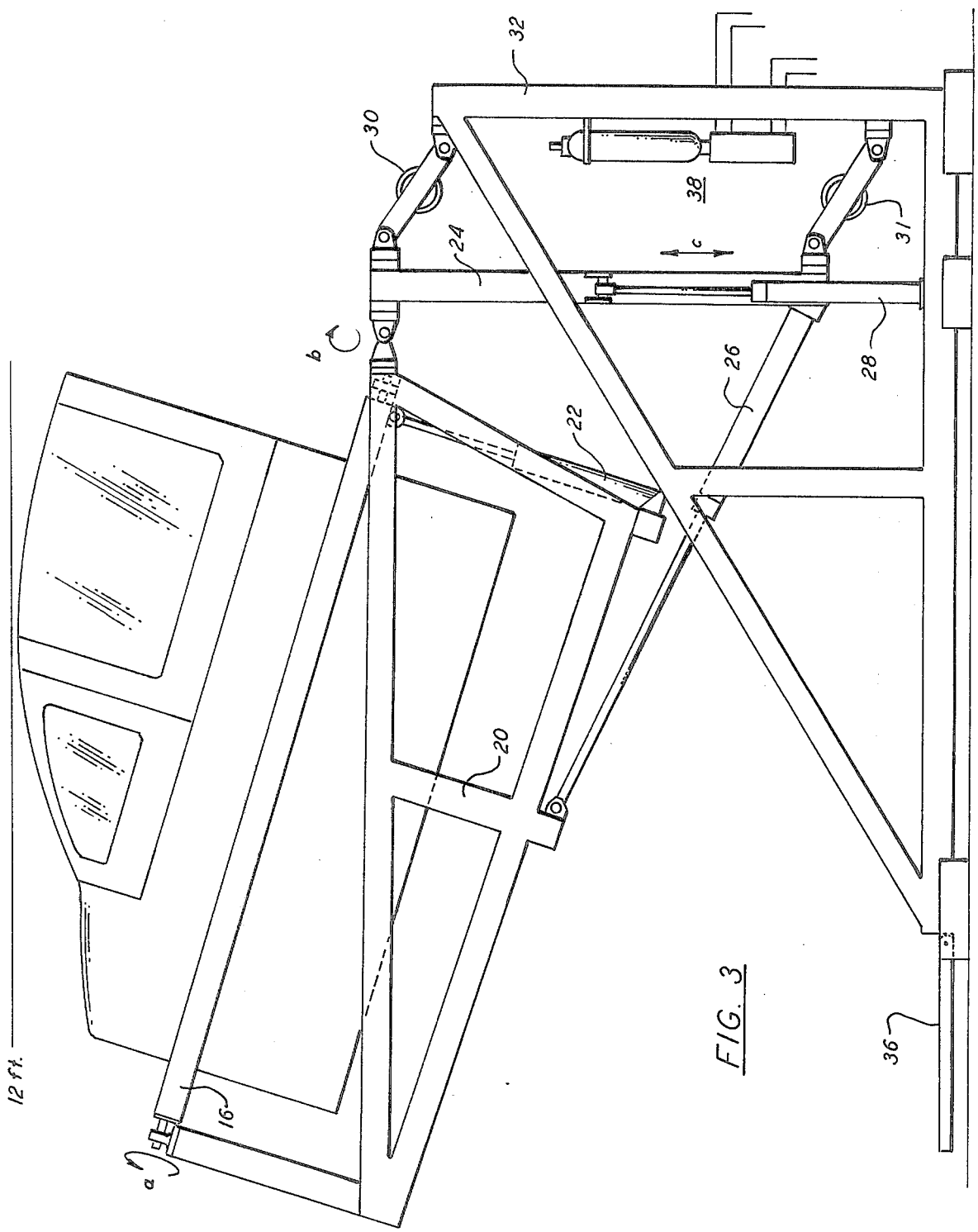
FIG. 3 is a side view of the embodiment illustrated in FIG. 1, further showing the supported cockpit pitched and translated upward by the improved motion system of the invention.

FIG. 3 generally illustrates the motion capabilities of the improved motion system. Cockpit 10 is depicted therein pitched and translated up. It could, of course, be simultaneously rolled either left or right. The arrows lettered a, b and c denote the roll, pitch and heave directions, respectively. It should be noted that support struts 36, 36 are pivoted out of the motion envelope when the motion system is operational. Note also that the unique nesting arrangement permits simulator installation within a room having only a 12 ceiling. Of course, if ceiling height is not a limiting factor, the motion system can accommodate other payload configurations which need not be nested within the roll frame.

Figure 4:
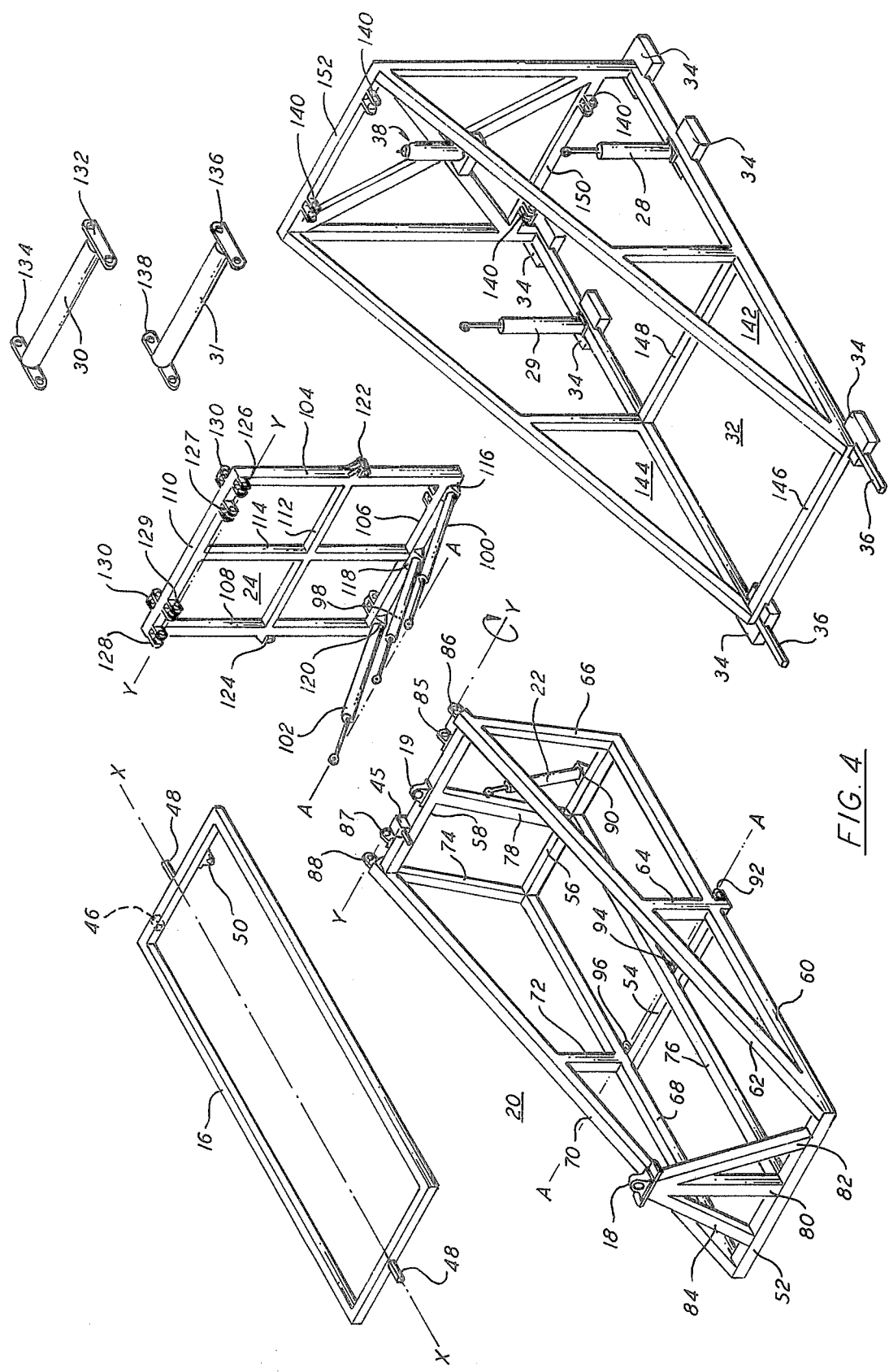
FIG. 4 is an exploded, detailed view of the apparatus illustrated in FIG. 1.

FIG. 4 is an exploded, detailed view of the improved motion system of the invention. As shown therein, roll frame 16 is a rectangular tubing frame of four members functioning as an inner gimbal rolling inside the pitch frame. Pivot studs or shafts 48 are co-axially secured to the front and rear of the roll frame to define a roll axis X—X. These studs are journalled in bearings 18, 19 carried by the pitch frame 20. A clevis or other roll actuator attachment plate 50 is fixedly secured at an off axis location to the rear cross member of roll frame 16. Roll servo actuator 22 exerts a torque on the roll frame to produce desired roll effects. A hole is drilled into the rear face of the aft cross member of roll frame 16 and a bushing 46 positioned therein to receive a roll lock pin, as more fully described below.

Pitch frame 20 is a welded, steel tubing assembly comprising a front cross member 52, an intermediate cross member 54, a lower rear cross member 56, an upper rear cross member 58, side members 60, 62, 64 and 66 forming a forward tapered truss on the right side of the assembly, side members 68, 70, 72, and 74 forming a forward tapered truss on the left side of the assembly, a longitudinal intermediate member 76 and a rear support column 78. Pitch frame 20 serves as an outer gimbal for roll frame 16 and supports the roll pivot bearings 18, 19. These bearings are preferably self-aligning, roller-bearing pillow blocks. The rear pillow block 19 is bolted to the top of rear cross member 58, directly above the support column 78. The front pillow block 18 is borne by a vertical post 80 mounted on front cross member 52. Post 80 is braced by a pair of diagonal struts 82, 84.

The pitch frame also includes two widely spaced pitch-pivot bearings 86, 88 at its upper rear, two safety bolt connecting plates 85, 87 inboard of said bearings, a roll cylinder attachment plate 90, at its lower rear, and three clevises 92, 94, 96 secured to intermediate cross member 54 for connecting the pitch actuators to the pitch frame.

Cross member 58 of pitch frame 20 supports a roll lock actuator 45 for driving a tapered pin 44 into bushing 46 in roll frame 16. Upon shut down and when the roll frame assumes a level position, hydraulic actuator 45 drives the tapered pin 44 into the locking hole. As the pin starts to engage, a microswitch (not shown) signals the associated computer to shut off the supply valve to the motion system. Inversely, in response to a Motion-On signal, the double acting actuator will retract the pin and, when the pin is fully retracted, a microswitch actuation overrides the interlock which prevents motion system operation until said retraction is complete.

Referring again to FIG. 4, it will be seen that heave frame 24 consists of four tubular members 104, 106, 108, 110, separated by a pair of perpendicular cross members 112, 114, to form a rigid, vertically standing rectangular frame. Three angles or other mounting means 116, 118, 120 are welded to the lower cross member 106 to provide support for the three pitch actuators 98, 100, 102. These identical linear actuators are connected to pitch frame clevises 92, 94, 96 respectively, along axis A—A, and are employed to rotate pitch frame 20 about pitch axis Y—Y. The center actuator 98 is servo driven; the two outer actuators 100, 102 are driven from an accumulator and are used to balance the load.

Gusseted brackets 122, 124, or other suitable attachment means, are located on each side of the heave frame to connect a pair of heave actuators 28, 29 to said frame. The heave frame is translated in a vertical direction by said linear hydraulic actuators 28, 29; the first of which is servo-driven and the second slaved to the first. Although it is possible to achieve the desired vertical translation with a single hydraulic cylinder, two cylinders are preferred because they provide equal push forces in a symmetrical manner on the heave frame.

Mounted on the front wall of the upper cross member 110 of the heave frame, are two tapped pivot supporting plates 126 and 128. These plates, in combination with bearings 86 and 88 on the pitch frame 20, define the pitch pivot points of the motion assembly. These points are appropriately located behind the trainer cockpit to realistically simulate pitch effects of many modern day operational aircraft.

Tapped plates 127, 129 for the safety bolt connections are also affixed to upper cross member 110 of the heave frame. These redundant connections provide an extra measure of safety in case of pitch-pivot failure.

Welded at the four corners on the aft side of the heave frame are four identical tapped plates 130 which receive, in bearing mounting relationship, the forward ends of parallel linkage arms 132, 134, 136, and 138. Each of these arms is fixedly secured, near its center, to an end of a pair of parallel, torsionally rigid, torque tubes 30, 31. The two torque tubes extend horizontally behind the heave frame and provide four points of support to said heave frame which resist twist and side motion. The aft ends of the torque tube arms are attached to the fixed frame, at points 140, to form bearings in a manner akin to the heave frame connections.

The torque tube arms in conjunction with vertical members of the heave and base frames form a unique 4-bar parallelogram linkage. As more fully described in U.S. Pat. No. 3,281,962, the major advantage of such a linkage is that the load imposed on the vertical translation cylinders is equal to the weight of the moving mass, regardless of how far the cylinders are located from the center of gravity of the moving mass. Further, the torque tubes are sized to insure the parallel motion of the heave frame during the maximum loading which can be imparted by the actuators or payload dynamics, and thus ensure lateral stability.

Base frame 32 is of welded, steel tubing construction consisting of 2 forward tapered side trusses 142, 144 and a series of cross members 146, 148, 150, and 152. The frame is X-braced at the rear to stabilize it in a lateral direction; other struts may also be employed to provide additional strength and stability. The base frame is designed to straddle the moving parts of the motion system, thus serving as a barrier to inadvertent encroachment into the area defined by the motion envelope. This frame also distributes the dynamic load over a relatively large area, thereby minimizing unit floor loading. It is lagged to the site floor through six steel plates 34 resting on rubber pads (not shown) which minimize transient shock.

An intermediate set of said floor plates are positioned beneath the heave actuators for transferring heave loading directly to the floor. The hydraulic distribution network 38, more fully described hereinafter, is supported by conventional means from the rear wall of base frame 32. So positioning the hydraulic network within the framework provides even greater compactness and protection.

In the above-described preferred construction, all frame members are made of rectangular or square, structural steel tubing for maximum rigidity, strength and economy, The bearings selected for the pivots are permanently lubricated, spherical bearings that ensure trouble-free operation. Cascading the frames permits the use of commercially available, short stroke, linear actuators. Since only one servo-actuator is required for each axis, power usage is kept to a minimum.

In the preferred embodiment, in addition to the three servo actuators, a slaved heave actuator and 2 balance pitch actuators are employed to stabilize the assembly and minimize pivot reaction loads. All of the hydraulic actuators are preferably commercially available, short-stroke, high pressure actuators with high column strength and low loading on seals.

Each actuator is equipped with limit switches (not shown) which automatically terminate motion when preset excursion limits are exceeded. Hydraulic cushion stops are placed beyond the electrical limit switches at both ends of each actuator. In case of complete electrical failure, these cushions, which are an integral part of the cylinders, will be of sufficient strength to maintain proper deceleration rates to terminate the motion without injury to personnel or damage to the equipment.

Figure 5:
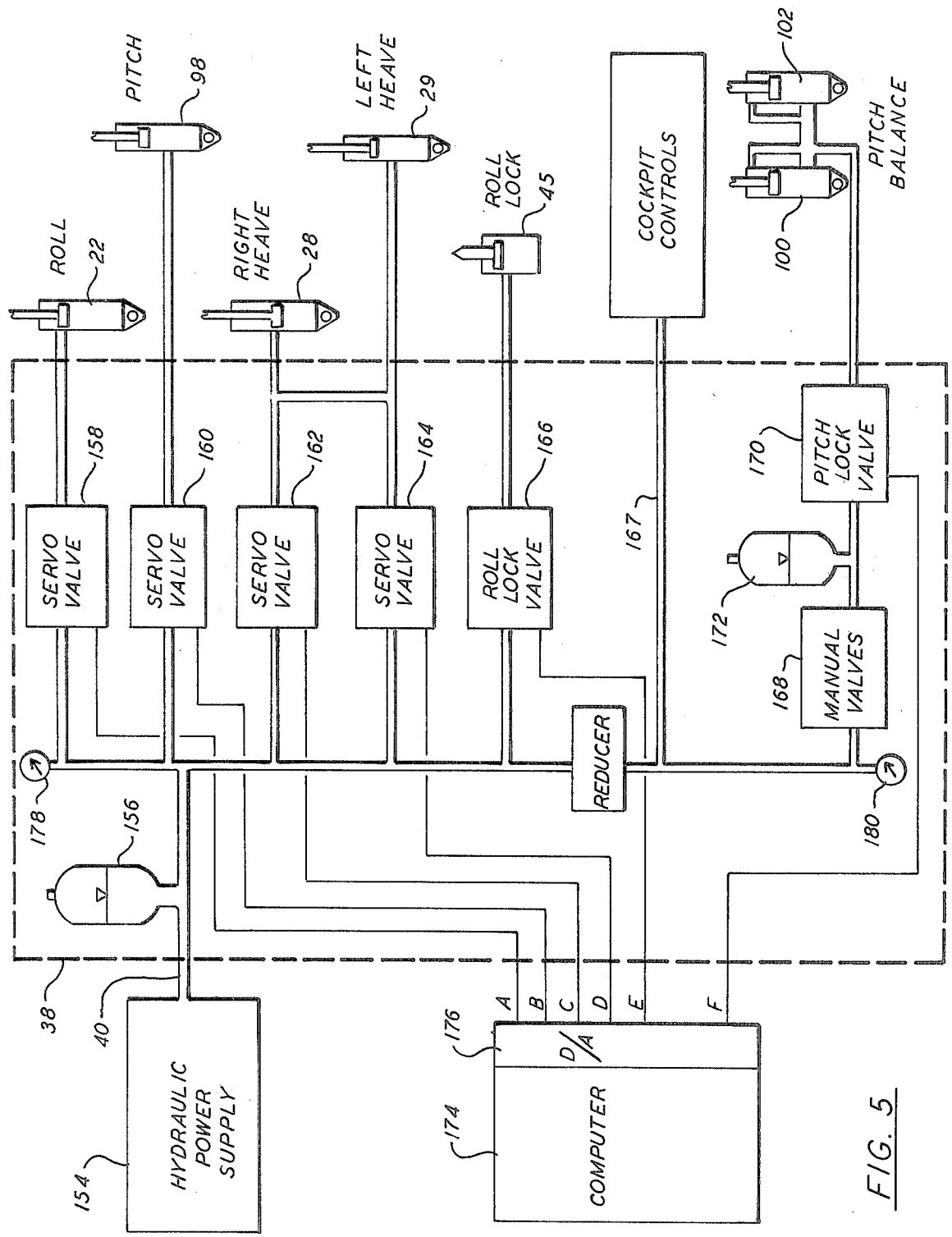
FIG. 5 is a block diagram illustrating a preferred hydraulic drive system for use with the motion system of the present invention.

The improved motion system of the invention is preferably hydraulically powered, since hydraulic systems normally better provide the required power together with fast response time, compact packaging, smooth action, and a lower noise level than either electrical or pneumatic systems. In the preferred construction of FIG. 5, a conventional hydraulic supply unit 154 delivers hydraulic fluid at, for example, 1500 psi, over supply line 40, to distribution and control network 38. Supply unit 154 might typically include a water-cooled, variable displacement pump powered by an electric motor, a hydraulic fluid reservoir, and pump control and safety valving (not shown). The size of the power unit will naturally depend on the duty cycle and required performance of the motion system.

The supply pressure is routed to an accumulator 156 and from there, through four computer-controlled servo valves 158, 160, 162, 164 to roll actuator 22, pitch actuator 98, right heave actuator 28 and left heave actuator 29, respectively. Two of the valves 162 and 164 feed a common supply port for the two heave actuators. Alternatively, a single, larger capacity servo valve could be used to control the two heave actuators. Supply pressure is also channeled from the accumulator through a four-way solenoid valve 166 to roll lock actuator 45.

Fluid at reduced pressure is applied through line 167 to the various cockpit controls. A reduced pressure supply line is also routed through manual control valves 168, which replenish or drain hydraulic fluid, to a closed loop, pitch balance actuator-accumulator system. This system includes a solenoid valve 170 which functions as a pitch lock by blocking the return of fluid from the two pitch balance actuators 100, 102 to an accumulator 172. Valve 170 is actuated when the pitch frame assumes a desired attitude and a Motion-Off signal is generated. When the fluid flow is blocked, the pressures on the top and the bottom of the balance cylinders equalize at a pressure which when multiplied by the piston red area of the actuator equals the load.

The servo and solenoid valves of the hydraulic system are typically controlled by electrical signals supplied by the flight simulator computer. In one preferred embodiment, a PDP-11 digital computer 174, manufactured by Digital Equipment Corporation, in conjunction with a conventional D/A converter 176, supplies electrical control signals over lines A-F to the hydraulic valves in accordance with the appropriate equations of motion.

In a manner well known in the art, position servo loops (not shown) process the control signals from the computer to drive said valves. The servo loops typically include summing amplifiers for error detection and scaling, power amplifiers to drive the servo valve, a dither signal to reduce the servo valve breaking friction, a follow-up potentiometer which monitors actuator extension and ancillary interlock and limit sensing circuits. Feedback is used in the servo loops to ensure smooth response without hunting and/or overshoot.

Upon receiving the processed control signals, the valves control the direction and flow rate of the hydraulic fluid to the actuators. The actuators impart motion to the corresponding frames to produce sensations of motion, similar to those experienced in an operational aircraft.

Gauges 178 and 180 provide indications of the pressures in the hydraulic supply lines. Standard return and drain lines (not shown) provide for hydraulic fluid return to the power supply unit, in conventional fashion.

The operation of the motion system will now be described.

When the motion system is turned off, the simulator is maintained in a level position with respect to pitch and roll by the hydraulic pitch lock mechanism and mechanical roll lock device. The heave frame settles to the retracted length of the heave actuators. For sustained shut-down and maintenance, the two manually positioned struts at the front of the base frame are positioned to support the pitch frame.

Upon activation of the motion system by the flight instructor, the roll lock pin will be retracted, the solenoid valve in the pitch lock mechanism will be opened and the heave actuators will be energized to lift the motion assembly to a central position, permitting the support struts to be rotated out of the motion envelope. The motion system is now operational and can be driven, under conventional computer control, to make maximum use of its excursion envelope and acceleration capability.

Acceleration cues in the heave, pitch, and roll directions will be provided by actuator imparted displacement of the cockpit a distance proportional to the magnitude of the sensed acceleration in the respective direction. This simulation method guarantees maximum utilization of the motion system excursion capability because the proportionality factor is scaled to provide maximum cockpit displacement in response to a value of sensed acceleration equal to the maximum acceleration attainable by the simulated aircraft during normal training maneuvers.

The proprioceptive cues provided by the motion system will be synchronized with the cockpit instrument indications since both are driven by signals computed from the same aircraft equations of motion. The instrument indications will accurately display the magnitude and direction of all accelerations, velocities and attitudes of the actual aircraft, while the propioceptive cues of acceleration will be in the same sense but only proportional to actual magnitude and duration.

All cockpit motions, except pitch, will be attenuated and the cockpit returned, at a subliminal rate, to the level flight position after computed accelerations have been executed. This return to the neutral position, commonly referred to as "wash-out", substantially enhances the motion system's simulation capabilities.

In this manner, the system smoothly operates over the entire range of excursions and accelerations to realistically reproduce, for the trainee, the motion sensations actually experienced during operation of the aircraft being simulated.

It should thus be clear that the improved motion system of the invention affords numerous advantages over the prior art. It permits substantial, simultaneous, independent movement in three degrees of freedom, within cramped quarters. It is an extremely economical system with extensive commonality of parts, extensive use of standard commercial components, minimum hose length and simplicity of fabrication. It is highly compact, requiring a minimum of ceiling height and floor space. The open framework permits easy maintenance while the use of only one servo actuator in each axis saves energy.

The system is mechanically fail-safe with redundant actuators, frame lock mechanisms, stabilizing torque tubes and other safety features. Further, it requires a minimum of disassembly to transport in a standard van; provides a rugged mounting surface for visual attachments; and is readily adaptable for scaling either up or down in accordance with the actual weight of the supported payload. Moreover, the unique mechanical construction of the instant invention provides extremely realistic simulation of aircraft motion.

It will thus be seen that the objects explicity set forth above, as well as those that are obvious and apparent from the above description, are efficiently attained.

Although in the preferred embodiment, a digital computer is employed to control the motion system, other computing devices, either general or special purpose, of, for example, an analog or hybrid nature, could perform this function. Alternatively, the hydraulic system could be made directly responsive to the cockpit controls, an instructor's console or other control signal generator.

While, in the preferred construction, a roll frame is employed to support the trainer cockpit and visual display equipment, it would be possible to eliminate this frame by connecting the roll studs directly to the fore and aft ends of the payload. Similarly, variations in the number, location and nature of the actuators, the configuration of the individual frames, and other aspects of the preferred embodiment are contemplated by the invention. Since these and other changes may be made in the above construction without departing from the scope of the invention, it is intended that the description of the preferred construction, as well as the accompanying drawings, be interpreted as illustrative and not in a limiting sense.

Having described my invention, what I claim as new and desire to secure by Letters Patent is:

1. A system for imparting motion to a cockpit of a grounded flight trainer, comprising:
   first frame means for supporting said cockpit for rotation about a longitudinal axis;
   a vertically translatable frame, at least a portion of said frame being disposed behind said first frame means;
   second means located between the rear of said first frame means and said frame portion for pivotally connecting the rear of said first frame means to said frame portion;
   linear actuator means connected between the first frame means and said portion of the vertically translatable frame for pivoting said first frame means about said second means;
   a fixed frame; and
   third means for connecting said vertically translatable frame to said fixed frame in a four-bar parallelogram linkage including at least one torque tube for laterally restraining said vertically translatable frame.

2. The system of claim 1, wherein said first frame means has an upper rear member;
   said frame portion has an upper cross member; and
   said second means pivotally connects said upper rear member to said upper cross member.

3. The system of claim 1, wherein the vertically translatable frame is totally disposed in a vertical plane behind the first frame means.

4. The system of claim 3, further comprising heave actuator means connected to the vertically translatable frame and disposed in said vertical plane alongside of the vertically translatable frame.

5. The system of claim 1, wherein said first frame means further includes means for supporting said cockpit in a nested relationship.

6. The system of claim 1, further comprising actuator means for selectively rotating the cockpit about said longitudinal axis, and vertically translating said vertically translatable frame.

7. The system of claim 1, wherein said third means includes a pair of torsionally rigid, torque tubes generally disposed in a vertical plane and having arms at their ends which connect said portion of the vertically translatable frame to the fixed frame in said four-bar parallelogram linkage.

8. The system of claim 1, further including manually positionable struts pivotally attached to said fixed frame for supporting the first frame means during sustained shut-down.

9. The system of claim 1, further including a hydraulic control and distribution network located between said fixed frame and said vertically translatable frame.

10. The system of claim 1, further comprising safety bolt means redundantly connecting said frame portion to the rear of said first frame means.

11. A system for imparting motion to a cockpit of a grounded flight trainer, comprising:
   first frame means for supporting said cockpit for rotation about a longitudinal axis;
   a vertically translatable frame, at least a portion of said frame being disposed behind said first frame means;
   second means located between the rear of said first frame means and said frame portion for pivotally connecting the rear of said first frame means to said frame portion;

said first frame means comprising a pair of gimbaled frames, the inner frame of said pair supporting said cockpit and the outer frame being connected at its rear to the vertically translatable frame by said second means;

a fixed frame; and third means for connecting said vertically translatable frame to said fixed frame in a four-bar parallelogram linkage including at least one torque tube for laterally restraining said vertically translatable frame.

12. The system of claim 11, further comprising:

roll actuator means mounted between said pair of gimbaled frames for rotating said inner frame about the longitudinal axis;

pitch actuator means mounted between said outer frame of said gimbaled pair and the vertically translatable frame for pivoting said outer frame about said second means; and heave actuator means for vertically moving said vertically translatable frame.

13. The system of claim 12, wherein said roll, pitch and heave actuator means comprise independently operable, hydraulicly powered, linear actuators.

14. The system of claim 13, wherein said roll actuator means comprises a single servo actuator;

said pitch actuator means comprises a servo actuator and a pair of balance actuators; and said heave actuator means comprises a pair of slaved servo actuators.

15. The system of claim 14 wherein each of said servo actuators is computer controlled.

16. The system of claim 14, further comprising:

an accumulator connected in a closed loop to said pair of balance actuators; and a solenoid valve located between said accumulator and said balance actuators for selectively blocking fluid flow therebetween.

17. The system of claim 11, further comprising:

actuator means mounted on the outer frame of said gimbaled pair for selectively driving a locking pin; and means defining an aperture in said inner frame of said gimbaled pair for receiving said locking pin, whereby said locking pin may be driven into said aperture to prevent relative movement of said gimbaled frames.

* * * * *